United States Patent [19]

Higgins et al.

[11] 4,368,727
[45] Jan. 18, 1983

[54] PORTABLE COOKING APPARATUS

[76] Inventors: Michael G. Higgins; Howard S. Ward, both of 19, High St., Camberley, Surrey GU15 3RB, England

[21] Appl. No.: 206,566

[22] Filed: Nov. 13, 1980

[30] Foreign Application Priority Data

Nov. 13, 1979 [GB] United Kingdom ................ 7939178
Oct. 1, 1980 [GB] United Kingdom ................ 8031675

[51] Int. Cl.³ .............................................. A24B 3/00
[52] U.S. Cl. ................................... 126/25 C; 126/38; 126/9 R
[58] Field of Search ............ 126/9 R, 9 A, 9 B, 25 R, 126/25 AA, 25 B, 25 C, 29, 275, 30, 38

[56] References Cited

U.S. PATENT DOCUMENTS

| | | | |
|---|---|---|---|
| 572,908 | 12/1896 | Peters | 126/38 |
| 857,063 | 6/1907 | Hofmann | 126/25 B |
| 1,894,348 | 1/1933 | Epstein | 126/9 A |
| 2,170,326 | 8/1939 | Headland | 126/25 B |
| 2,502,434 | 4/1950 | Creitz | 126/38 |
| 2,584,040 | 1/1952 | Naranick | 126/9 A |
| 2,877,759 | 3/1959 | Giese | 126/9 B |
| 3,139,880 | 7/1964 | Sangeorge | 126/25 C |

FOREIGN PATENT DOCUMENTS 1125129  3/1962  Fed. Rep. of Germany .......... 126/9

*Primary Examiner*—Samuel Scott
*Assistant Examiner*—G. Anderson
*Attorney, Agent, or Firm*—Sherman & Shalloway

[57] ABSTRACT

A portable cooking apparatus comprises a container having a lower end part to be heated, and a tunnel member arranged to receive at its upper end region the lower end part of the container and to receive at its lower end region a burner; the container and the tunnel member are so shaped that the container is movable from an elevated position where it rests with its lower end spaced above the burner to be heated by the burner flame, to a lower position where its lower end will extinguish the burner flame.

The apparatus may also comprise a base pan to receive the lower end region of the tunnel member and provided with a handle which is movable from a lowered position where it acts as a carrying handle to a raised position where it acts to hold the tunnel member securely sandwiched between the base pan and the container.

The apparatus is intended for use in a cooker kit or set together with a capped burner can nesting in the upper end region of the container so that the cap of the burner can is engaged by said handle when in its raised position. A second burner can may nest in the lower region of the tunnel member to engage the lower end of the container, or a tube of burner fuel, having a capacity similar to that of the can, may be provided to refill the can when required.

10 Claims, 7 Drawing Figures

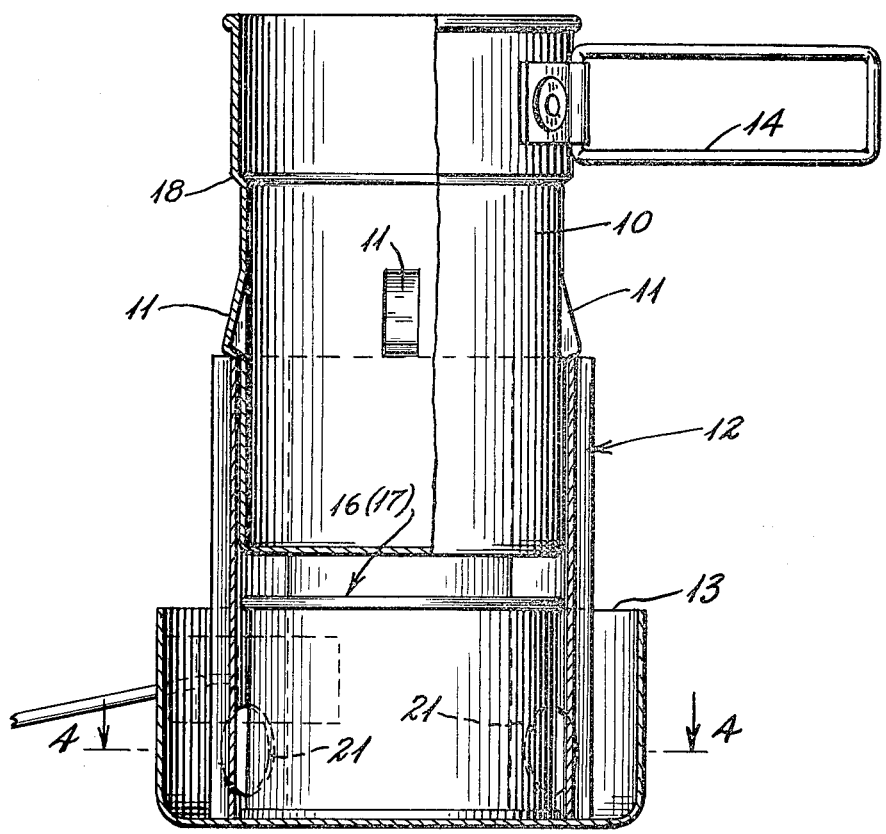
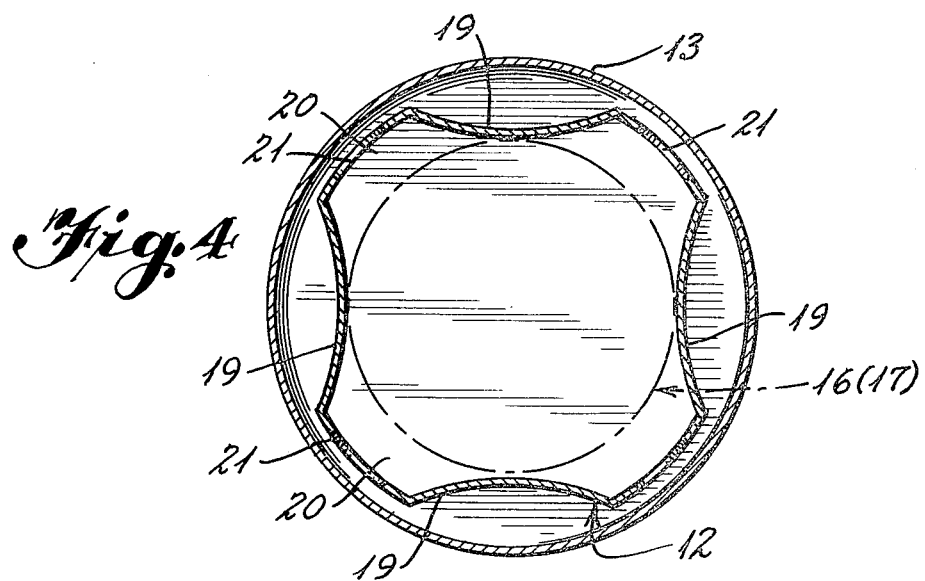

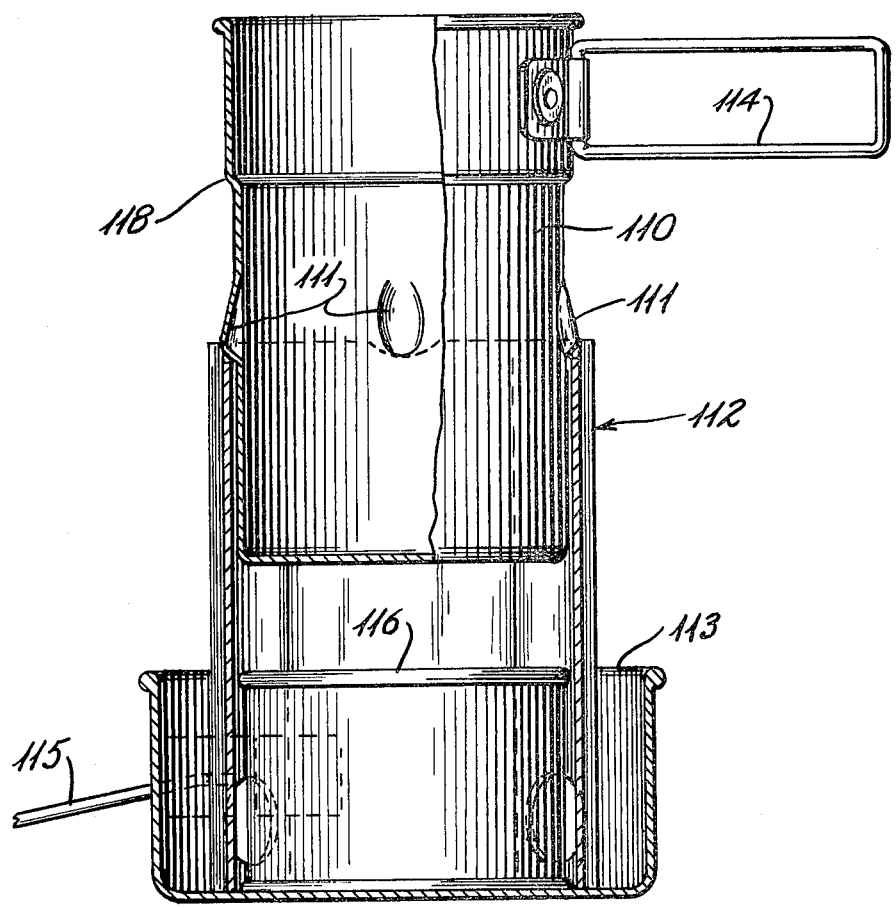

PORTABLE COOKING APPARATUS

This invention relates to portable cookers, and is particularly applicable to small solid-fuel cookers of the kind issued as personal equipment for use in military exercises.

One well known type of cooker of this kind employs a burner in the form of a screw-cap can containing a block of fuel covered by metal foil. In use, the can is opened and the foil broken to expose the top of the fuel block which is then lit to produce a flame. A small, ring-like stand or gantry is then fitted on the rim of the can to support an article such as a kettle or a mess-tin to be heated. Although these units have proved to operate satisfactorily, they do have the disadvantage for military use that the flame is visible through openings in the sheet metal stand and may be clearly visible when the stand is removed to allow the flame to be extinguished; this may be unacceptable, particularly for night manoeuvres. A further disadvantage is that considerable heat may be lost, and this loss can be almost unacceptable in windy conditions. Yet a further disadvantage is that the exposed flame constitutes a fire hazard.

It is an object of the present invention to overcome or at least reduce the above disadvantages.

In accordance with the present invention, there is provided portable cooking apparatus comprising a container having a lower end part to be heated, and a tunnel member arranged to receive at its upper end region the lower end part of the container and to receive at its lower end region a burner, the container and the tunnel member being so arranged that the container is movable from an elevated position where it rests with its lower end spaced above the burner to be heated by the burner flame, to a lower position where its lower end will extinguish the burner flame.

Preferably, the apparatus also comprises a base pan to receive the lower end region of the tunnel member, the base pan being provided with a handle which is movable from a lowered position where it acts as a carrying handle to a raised position where it acts to hold the tunnel member securely sandwiched between the base pan and the container.

The invention further provides a cooker kit or set comprising said container, said tunnel member and said base pan, together with a capped burner can nesting in the upper end region of the container so that the cap of the burner can is engaged by said handle when in its raised position.

A second burner can may nest in the lower region of the tunnel member to engage the lower end of the container, and both cans may contain fuel.

Alternatively, only the first-mentioned can may be provided, and a tube of burner fuel, having a capacity similar to that of the can, may be provided to refill the can when required. Alternatively, the single can may be supplied empty, to be filled and refilled as required. The provision of only one can reduces the overall height of the cooker kit and, particularly when the can is supplied empty, the can may be of shallower form to reduce the overall height even further.

A preferred fuel is solidified ethyl-alcohol, which is non-toxic.

Embodiments of the invention will now be described, by way of example, with reference to the accompanying drawings in which:

FIG. 3 is a largely sectional other side elevation showing the cooker in its in-use state;

FIG. 4 is a section on the line IV—IV of FIG. 3;

FIG. 7 is a largely-sectional other side elevation showing the cooker of FIG. 5 in its in-use state.

Figure 1:
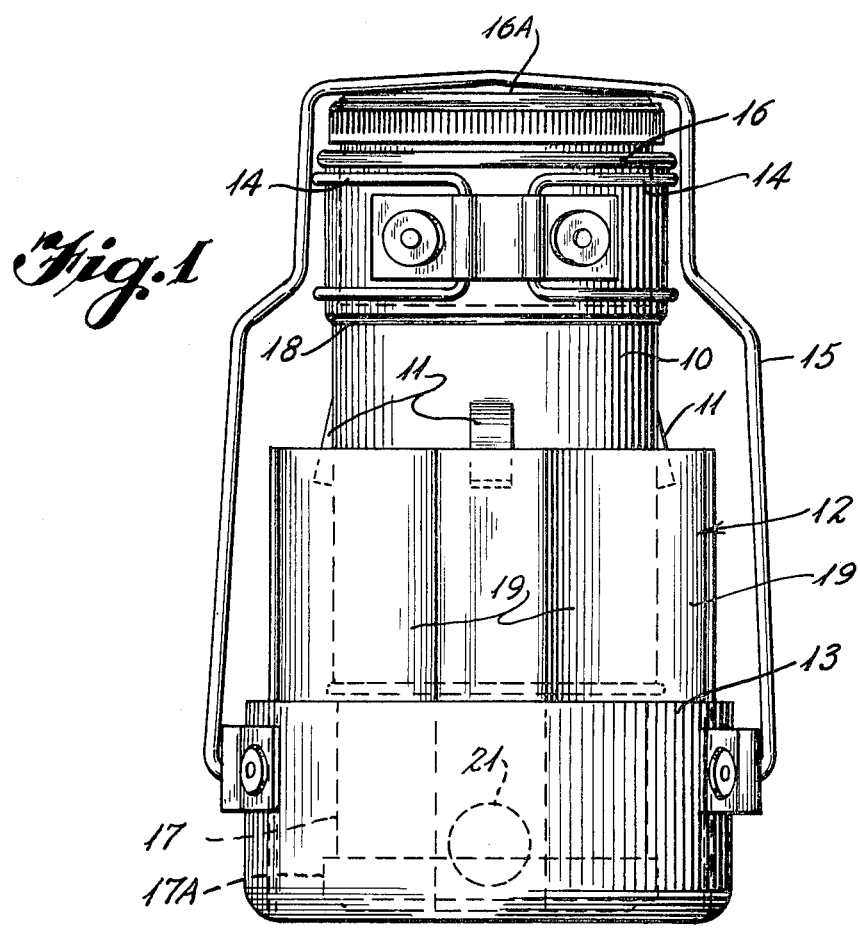
FIG. 1 is a side elevation showing a cooker kit or set according to the invention, in its packed state.
Figure 2:
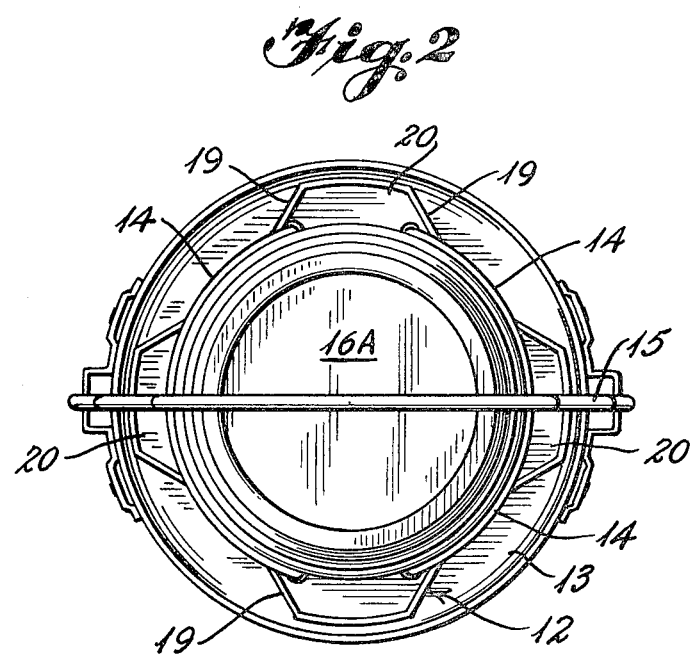
FIG. 2 is a plan view corresponding to FIG. 1.

Referring to FIGS. 1 and 2 of the drawings, the cooker kit comprises a tubular container 10 formed with four wedge-like projections 11, a shaped tunnel member 12 and a base pan 13. The container and the base pan are formed of aluminium alloy, and are provided with steel handles 14 and 15, respectively.

The kit also includes two burners 16, 17, each comprising a foil-covered quantity of solidified ethyl alcohol fuel contained in a can having a screw cap 16A, 17A.

As shown in FIGS. 1 and 2, the parts of the cooker kit are held together by the handle 15 which is pivotally mounted on the base pan 13 and, in its raised position, engages the screw cap 16A of the upper burner 16. In this position, the upper can nests in the upper end region of the container 10 which is formed with a shoulder 18 to support the bottom of the can, and the lower burner 17 nests inverted in the lower end region of the tunnel member 12 to support the lower end of the container 10.

FIG. 2, and also FIG. 4, show the section of the tunnel member 12 which is formed with four inwardly-curved parts 19 and provides four axial channels 20. The tunnel member is also of aluminium alloy, and may be produced by extrusion or by rolling curves (19) into a circular section.

In the position shown in FIG. 1, the four projections 11 on the container 10 enter the channels 20 to allow the lower end of the container to rest on the inverted bottom of the lower burner 17. The steel handle 15 is resilient, so that the components of the cooker kit are held firmly and compactly together in such a manner as to minimise rattle, and it will be appreciated that any abrasive damage which the handle 15 might cause will be borne by the cap 16A of the upper burner 16 which is, of course, frequently replaced.

To use the cooker, the handle 15 is pushed out of engagement with the burner cap and swung down to the generally horizontal position indicated in FIG. 3. The container 10 is then lifted from the tunnel member 12, and the burners are removed from the container and the tunnel member. One of the burners is then opened and lit, and placed in the base pan 13, and the tunnel member is placed over the lighted burner. This lighting operation is carried out in a suitably shielded location.

It will be noted that a port 21 is formed near the bottom end of each channel wall to provide combustion air flows for the burner flame, and combustion gases will exhaust upwardly through the channels 20.

The container 10 is then inserted into the tunnel member 12, orientated so that the projections 11 rest on the top edges of the curved parts 19 to hold the container in an elevated position with its lower end spaced the appropriate distance above the burner. In this position, the container is heated efficiently and also quietly, due to the gas flow system, and without the burner flame being exposed which can be of great importance in military night manoeuvres.

After use or in an emergency situation, the burner flame can be extinguished merely by turning the container 10 through about 45 degrees so that the projections 11 can enter the channels 20, and lowering the container so that its lower end closes the mouth of the burner can. Again, this operation can be completed without exposing the flame to view.

The cooker can be employed to heat water or tins of food in the container 10 which can be safely lifted by means of its handles 14 in their extended positions as indicated in FIG. 3; such handles are known. The base pan 13 can also be lifted safely when its handle 15 is in the lowered position where it is a carrying handle, thus allowing the cooker to be carried (carefully) during a cooking operation or while still hot after cooking. The container 10 can also be used as a cup or mug, and the base pan 13 can also be used as a frying pan or saucepan or as a mess-tin.

Figure 5:
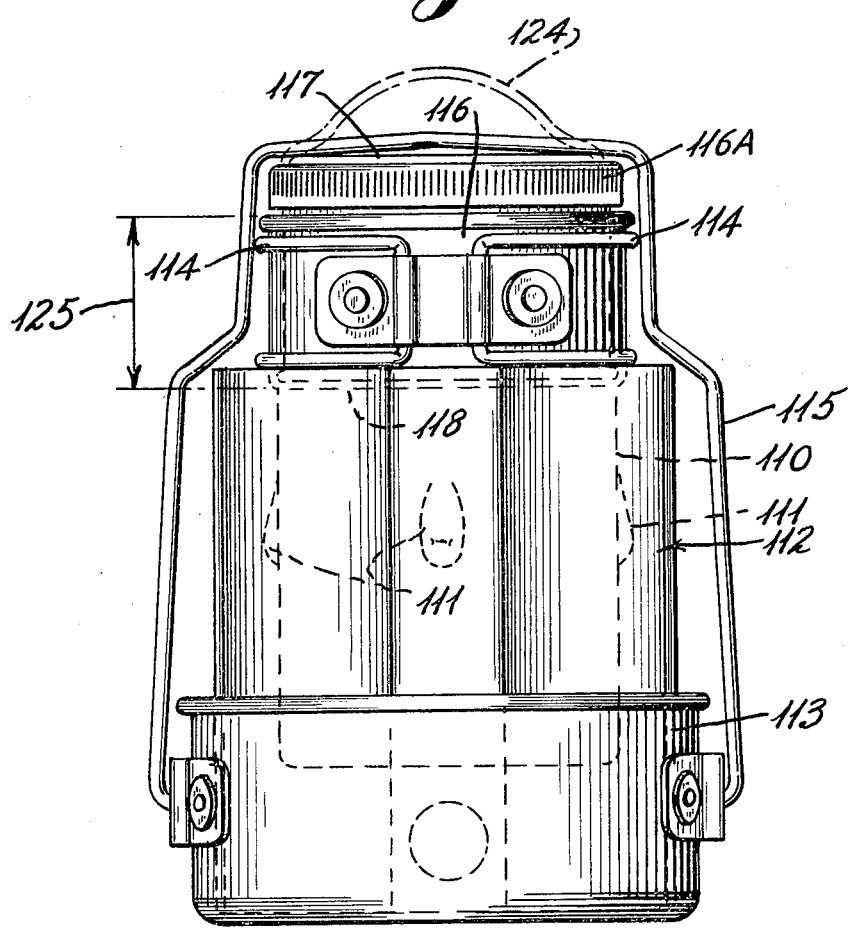
FIG. 5 is a side elevation showing another form of cooker kit or set according to the invention, in its packed state.
Figure 6:
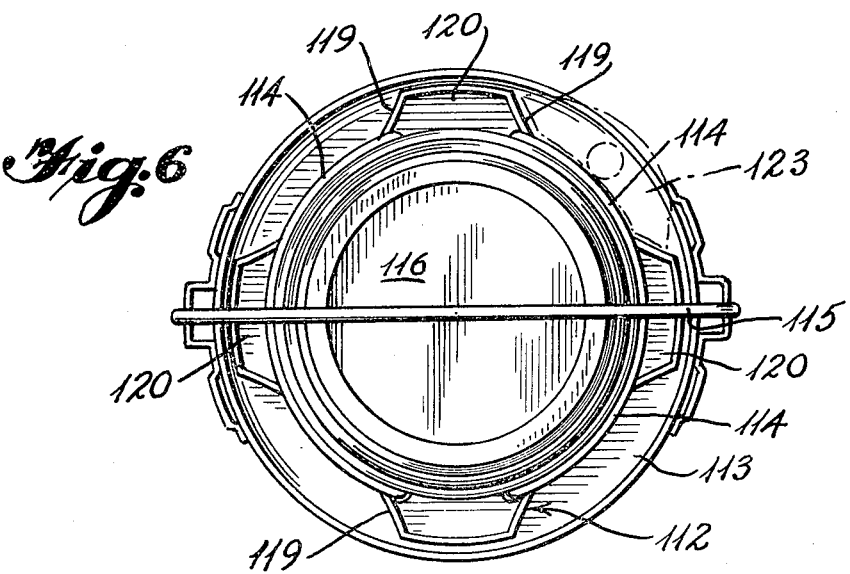
FIG. 6 is a plan view corresponding to FIG. 5.

Referring now to FIGS. 5 to 7, the cooker kit comprises a tubular container 110 formed with four projections 111 of rounded wedge-like form, a shaped tunnel member 112 and a base pan 113. The container and the base pan are provided with handles 114 and 115, respectively. These parts are similar to the parts 10 to 15 illustrated in FIGS. 1 to 4.

The kit also includes a single burner 116, comprising a foil-covered quantity of solidified ethyl alcohol fuel contained in a can having a screw cap 116A.

As shown in FIG. 5, the parts of the cooker kit are held together by the handle 115 which in its raised position, engages the screw cap 116A of the burner can. In this position, the can nests in the upper region of the container 110 which is formed with a shoulder 118 to support the bottom of the can.

In the position shown in FIGS. 5 and 6, the four projections 111 on the container 110 enter channels 120 to allow the container to extend deeply into the tunnel member, and be supported by its handles 114 which engage the upper end of the tunnel member. The lower end of the tunnel member rests on the base pan 113, and the components of the cooker kit are held firmly and compactly together; as in the first embodiment, any abrasive damage which the handle 115 might cause will be borne by the cap 116A of the burner 116 which is periodically replaced.

To use the cooker, the burner 116 is removed, opened and lit, and placed in the base pan 113, and the tunnel member is placed over the lighted burner.

The container 110 is then inserted into the tunnel member 112, orientated so that the projections 111 rest on four shallow locating recesses 122 in the top edges of the curved parts 119 of the tunnel member to hold the container in an elevated position with its lower end spaced the appropriate distance above the burner.

The burner flame can be extinguished merely by turning the container through about 45 degrees so that the projections 111 can enter channels 120 of the tunnel member, and lowering the container so that its lower end closes the mouth of the burner can 116.

When the fuel in the burner can 116 is exhausted, the can can be refilled to the required degree from a tube of (jelly-like) solidified ethyl alcohol fuel, which will usually be supplied with the cooker kit. On average, a fuel can is used ten times before being replaced, and so a kit may be supplied with nine tubes. The kit may be supplied in a carrier pack having a supply of tubes and, in one convenient arrangement, four tubes are nested into the four recesses (119) of the tunnel member as indicated at 123 in FIG. 6.

The handle 115 may be formed with, for example, a raised central part such as indicated at 124 in FIG. 5, or with a loop, to provide a finger space and so facilitate handling. Also, the fuel can 116 may be of lesser depth than as illustrated. Thus, the upper length of the container 110 (indicated at 125 in FIG. 5) would be reduced, as would the length of the tunnel member 112 to maintain the correct spacing of the container base above the burner can, and the overall height of the set would be further reduced. Particularly when the can 116 is of reduced depth, the can may be supplied empty to be filled and refilled as required from the tube.

The cooker kits are also attractive to the leisure market, particularly for use in camping where fire hazard is minimised by the flame being shielded and readily extinguishable. Also, the tubes of fuel are useful for lighting camp fires, home barbecues, etc.

Further modifications may be made without departing from the scope of the invention. For example, the tunnel members 12, 112 may be formed of alternative sections which provide only three or more than four channels (20, 120) and the projections 11, 111 may be of different form to the press-outs illustrated. Also, projections rather than recesses (122) may be provided at the upper end of the tunnel member to resist accidental turning of the container 10 or 110.

Alternative burners may also be employed although the type described is very attractive in that one or a pair of the burner cans can be accommodated in the packed kit, and in that the solidified ethyl alcohol fuel does not produce toxic fumes which can be dangerous in confined spaces as, for example, when hexamine fuel is used.

We claim:

1. A portable cooking apparatus comprising a container having a lower end part to be heated, and a tunnel member arranged to receive at its upper end region the lower end part of the container and to receive at its lower end region a burner, the container and the tunnel member being formed with projection and recess means, respectively, which in one position engage and hold the container in an elevated position wherein the container rests with its lower end spaced above the burner to be heated by the burner flame, and in another position allow the container to move to a lower position wherein the lower end of the container will extinguish the burner flame.

2. A portable cooking apparatus as claimed in claim 1, in which said tunnel member comprises a shaped tubular extrusion.

3. A portable cooking apparatus as claimed in claim 1 or claim 2, in which openings are provided at the bottom end region of said channels for entry of combustion air.

4. A portable cooking apparatus as claimed in claim 1 or claim 2, in which means are provided on said top edge parts of the tunnel member to resist unwanted turning movement of said container.

5. A portable cooking apparatus as claimed in claim 1 and further comprising a base pan to receive the lower end region of the tunnel member, a handle on the base pan which is movable from a lowered position where it acts as a carrying handle to a raised position where it holds the tunnel member securely sandwiched between the base pan and the container.

6. A portable cooker kit as claimed in claim 5, and further comprising a capped burner can nesting in the upper end region of the container so that the cap of the burner can is engaged by said handle when in its raised position.

7. A portable cooker kit as claimed in claim 6 and further comprising a second burner can testing in the lower region of the tunnel member to engage the lower end of the container.

8. A portable cooker kit as claimed in claim 6 and further comprising a tube of burner fuel, having a capacity similar to that of said can, to refill the can when required.

9. A portable cooker kit, as claimed in claim 6 or claim 7, in which a quantity of solidified ethyl alcohol fuel is contained in said burner can.

10. A portable cooker kit as claimed in claim 8, in which a quantity of solidified ethyl alcohol fuel is contained in said tube.

* * * * *

UNITED STATES PATENT AND TRADEMARK OFFICE
CERTIFICATE OF CORRECTION

PATENT NO. : 4,368,727
DATED : January 18, 1983
INVENTOR(S) : Michael George Higgins, et al.

It is certified that error appears in the above—identified patent and that said Letters Patent is hereby corrected as shown below:

Claim 7, line 2, change "testing" to --- nesting ---.

Signed and Sealed this

Twenty-sixth Day of April 1983

[SEAL]

Attest:

GERALD J. MOSSINGHOFF

*Attesting Officer*  *Commissioner of Patents and Trademarks*